(12) United States Patent
Kinoshita et al.

(10) Patent No.: US 8,781,303 B2
(45) Date of Patent: Jul. 15, 2014

(54) PROGRAM ACCUMULATION APPARATUS, PROGRAM ACCUMULATION RESERVATION METHOD, AND PROGRAM

(75) Inventors: Akihiko Kinoshita, Tokyo (JP); Hiroyuki Chiba, Kanagawa (JP); Takashi Kanao, Tokyo (JP); Tsuyoshi Honma, Chiba (JP); Hirofumi Kouda, Saitama (JP)

(73) Assignee: Sony Corporation, Tokyo (JP)

( * ) Notice: Subject to any disclaimer, the term of this patent is extended or adjusted under 35 U.S.C. 154(b) by 992 days.

(21) Appl. No.: 12/387,137

(22) Filed: Apr. 28, 2009

(65) Prior Publication Data

US 2009/0279847 A1 Nov. 12, 2009

(30) Foreign Application Priority Data

Apr. 30, 2008 (JP) ................. P2008-119356

(51) Int. Cl.
| | |
|---|---|
| H04N 5/76 | (2006.01) |
| H04N 21/472 | (2011.01) |
| H04N 5/445 | (2011.01) |
| H04N 21/61 | (2011.01) |
| H04N 5/782 | (2006.01) |
| H04N 7/173 | (2011.01) |
| H04N 21/482 | (2011.01) |
| H04N 21/63 | (2011.01) |

(52) U.S. Cl.
CPC ... *H04N 21/47214* (2013.01); *H04N 21/47202* (2013.01); *H04N 5/44543* (2013.01); *H04N 5/782* (2013.01); *H04N 7/17336* (2013.01); *H04N 21/482* (2013.01); *H04N 21/6125* (2013.01); *H04N 21/631* (2013.01)
USPC ............................ 386/296; 386/291; 386/297

(58) Field of Classification Search
CPC .............. H04N 5/44543; H04N 5/782; H04N 21/47214; H04N 21/47202; H04N 7/17336; H04N 5/482; H04N 21/482; H04N 21/6125; H04N 21/631
USPC ........... 386/291–299; 725/39–47, 58, 86–103
See application file for complete search history.

(56) References Cited

U.S. PATENT DOCUMENTS

| 6,002,394 A | 12/1999 | Schein et al. |
|---|---|---|
| 6,208,799 B1 | 3/2001 | Marsh et al. |

(Continued)

FOREIGN PATENT DOCUMENTS

| EP | 1670242 A1 | 6/2006 |
|---|---|---|
| JP | 10174037 A | 6/1998 |

(Continued)

OTHER PUBLICATIONS

European Search Report EP 09156578, dated Apr. 28, 2010.

(Continued)

*Primary Examiner* — Gelek W Topgyal
(74) *Attorney, Agent, or Firm* — Sony Corporation

(57) ABSTRACT

A program accumulation apparatus includes: a broadcast program acquisition section to acquire data of a broadcast program based on a preset recording reservation; a delivery program acquisition section to acquire data of a delivery program delivered by a downloading method via a network based on a preset download reservation; a storage section to accumulate the data of the broadcast program or the data of the delivery program; a designation section to accept a designation of the broadcast program for the recording reservation; a judgment section to judge whether the recording reservation of the designated broadcast program is possible; and a setting section to judge, when the recording reservation of the designated broadcast program is judged as being impossible, whether the download reservation of the delivery program of the same source as the broadcast program is possible, and set the download reservation of the delivery program when judged possible.

20 Claims, 11 Drawing Sheets

(56) References Cited

U.S. PATENT DOCUMENTS

| | | | |
|---|---|---|---|
| 6,532,591 B1* | 3/2003 | Arai et al. | 725/132 |
| 7,571,454 B2* | 8/2009 | Potrebic et al. | 725/50 |
| 7,822,319 B2* | 10/2010 | Miyazaki | 386/291 |
| 7,890,973 B2* | 2/2011 | Urabe et al. | 725/39 |
| 2002/0046407 A1* | 4/2002 | Franco | 725/110 |
| 2004/0221308 A1* | 11/2004 | Cuttner et al. | 725/46 |
| 2005/0160462 A1* | 7/2005 | Shikata et al. | 725/58 |
| 2005/0257130 A1* | 11/2005 | Ito | 715/500.1 |
| 2006/0083483 A1* | 4/2006 | Suzuki | 386/83 |
| 2006/0215988 A1 | 9/2006 | Tol et al. | |
| 2006/0265427 A1* | 11/2006 | Cohen et al. | 707/200 |
| 2007/0174336 A1* | 7/2007 | Day et al. | 707/104.1 |
| 2007/0180473 A1* | 8/2007 | Song et al. | 725/58 |
| 2007/0288967 A1 | 12/2007 | Candelore et al. | |
| 2008/0025306 A1 | 1/2008 | Kamura | |
| 2008/0285943 A1* | 11/2008 | Wang et al. | 386/83 |
| 2010/0251299 A1* | 9/2010 | Scott et al. | 725/39 |

FOREIGN PATENT DOCUMENTS

| | | |
|---|---|---|
| JP | 2006524459 T | 10/2006 |
| JP | 2007096998 A | 4/2007 |
| JP | 2007124534 A | 5/2007 |
| JP | 2008-035401 A | 2/2008 |
| JP | 2008199339 A | 8/2008 |
| WO | 0158150 A2 | 8/2001 |
| WO | 2004091217 A1 | 10/2004 |

OTHER PUBLICATIONS

Office Action from Japanese Application No. 2008-119356, dated Feb. 9, 2010.

* cited by examiner

D1 EPG data

| Program ID | Program name | Start date /time | End date /time | Channel | Bit rate (size) | Thumbnail | Details | DL-available date/time | DL source URL |
|---|---|---|---|---|---|---|---|---|---|

FIG.4

|  | 1ch | 2ch | 3ch |
|---|---|---|---|
| 12:00<br>~<br>13:00 | Program A [DL] | Program D [DL] | Program G |
| 13:00<br>~<br>14:00 | Program B | Program E [DL] | Program H |
| 14:00<br>~<br>15:00 | Program C | Program F [DL] | Program I |

[DL] Program that can be downloaded

FIG.5

| Reservation data | | | | |
|---|---|---|---|---|

D3 Recording reservation data

| Program ID | Program name | Start date/time | End date/time | Channel |
|---|---|---|---|---|
| 0001 | A | 2008.3.2 12:00 | 2008.3.2 13:00 | 1 |

D4 DL reservation data

| Program ID | Program name | DL-available date/time | DL source URL |
|---|---|---|---|
| 0002 | B | 2008.3.2 13:00 | 211.22.13.55 |

PROGRAM ACCUMULATION APPARATUS, PROGRAM ACCUMULATION RESERVATION METHOD, AND PROGRAM

The present application claims priority from Japanese Patent Application No. JP 2008-119356, filed in the Japanese Patent Office on Apr. 30, 2008, the entire content of which is incorporated herein by reference.

BACKGROUND OF THE INVENTION

1. Field of the Invention

The present invention relates to a program accumulation apparatus, a program accumulation reservation method, and a program therefor that are capable of accumulating, for example, a broadcast program and a VOD (Video On Demand) program.

2. Description of the Related Art

Recent years, recording apparatuses capable of recording/reproducing data of programs and contents delivered through various transmission media to/from recording media having a large capacity, such as an HDD (Hard Disk Drive), a DVD (Digital Versatile Disc), and a Blu-ray disc have become common. Delivery systems for programs and contents are diversified, and examples thereof include a delivery system that uses broadcast radio waves as a transmission medium, such as terrestrial analog broadcast, terrestrial digital broadcast, BS broadcast, and CS broadcast, and a delivery system that uses a network as a transmission medium, such as an IP multicast system and a VOD system.

The IP multicast system is a system in which broadcast programs delivered by multicast from a server, that is a delivery source of programs and contents, via a network are taken in by a recording apparatus to be recorded therein. The VOD system is a system in which, in response to a user's request with respect to the deliver source server made via the network to deliver a content including program data, the content including program data delivered from the server is taken in by a recorder such as a recording apparatus of the user to be stored therein. Examples of the VOD system include a streaming method for delivering program data as a stream and a downloading method (hereinafter, referred to as "DL method") for delivering the program data as a file of a file system.

In descriptions below, a recording apparatus for receiving and recording data of broadcast programs and a recorder for taking in and recording data delivered by the VOD system and the like will collectively be referred to as "program accumulation apparatus". Moreover, "program accumulation" in the specification refers to recording of broadcast program data and storage of VOD program data.

Incidentally, in program accumulation apparatuses of this type, there is known a function of registering in advance a keyword with which a program that matches a preference of a user can be specified, retrieving the program that matches the preference of the user from guide information of programs or contents scheduled to be delivered, such as an EPG (Electronic Program Guide) and an ECG (Electronic Contents Guide) based on the registered keyword, and automatically recording the program. In addition, a function of automatically judging a preference of a user based on past program recording reservations or viewing histories and retrieving a program that matches the preference from guide information of programs and contents scheduled to be delivered, to thus automatically record the program is also known (see Japanese Patent Application Laid-open No. 2008-35401 (paragraph [0020], FIG. 1).

SUMMARY OF THE INVENTION

With the program accumulation apparatus as described above, however, in a case where a recording date/time of a broadcast program newly set to a recording reservation overlap a recording date/time of a different broadcast program already set to the recording reservation, it has at least been difficult to record a temporally-overlapping part of the program newly set to the recording reservation. Alternatively, it has been necessary to carry out a troublesome operation of, for example, canceling the already-set recording reservation of a broadcast program and validating the new recording reservation of a broadcast program. Moreover, it has also been necessary to cancel the recording of a broadcast program when a sufficient free storage capacity is not left in a storage medium such as an HDD for accumulating program data.

In view of the circumstances as described above, there is a need for a program accumulation apparatus, a program accumulation reservation method, and a program therefor that are capable of reducing the number of times recording reservations of programs need to be canceled.

According to an embodiment of the present invention, there is provided a program accumulation apparatus including a broadcast program acquisition means, a delivery program acquisition means, a storage section, a designation means, a judgment means, and a setting means. The broadcast program acquisition means acquires data of a broadcast program based on a preset recording reservation. The delivery program acquisition means acquires data of a delivery program delivered by a downloading method via a network based on a preset download reservation. The storage section accumulates one of the data of the broadcast program acquired by the broadcast program acquisition means and the data of the delivery program acquired by the delivery program acquisition means. The designation means accepts a designation of the broadcast program to be set to the recording reservation, that has been made by a user. The judgment means judges whether the recording reservation of the designated broadcast program is possible. The setting means judges, when the recording reservation of the designated broadcast program is judged as being impossible, whether the download reservation of the delivery program of the same source as the broadcast program is possible, and sets the download reservation of the delivery program when judged that the download reservation is possible.

In the embodiment of the present invention, even when the recording reservation of the designated broadcast program cannot be set from a reason of a lack of a tuner due to the temporal overlap with another recording reservation or an insufficient free storage capacity of the storage section, if the data of the delivery program of the same source as the broadcast program can be delivered by the downloading method, the data of the entire program can be acquired fully and accumulated by setting the download reservation of the delivery program.

Further, the program accumulation apparatus according to the embodiment of the present invention may further include a download availability information acquisition means for acquiring download availability information containing information for specifying the delivery program of the same source as the broadcast program. In this case, the setting means may judge whether the download reservation of the delivery program of the same source as the broadcast program is possible based on the download availability information.

Accordingly, it is possible to accurately judge whether the download reservation of the delivery program of the same source as the broadcast program is possible.

The program accumulation apparatus according to the embodiment of the present invention may further include a reservation data storage section and a change means. The reservation data storage section stores recording reservation data of the broadcast program and download reservation data of the delivery program. The change means judges, when a content of the reservation data storage section is updated, with respect to the download reservation data stored in the reservation data storage section, whether the recording reservation of the broadcast program of the same source as the delivery program, that is a target for the download reservation, is possible, and changes, when judged that the recording reservation is possible, the download reservation data to the recording reservation data for the recording reservation of the broadcast program.

In the embodiment of the present invention, with the update such as a cancel of the recording reservation or the download reservation as a trigger, in prospect of a change in availability of the tuner due to the temporal overlap with another recording reservation and an amount of increase of the free storage capacity of the storage section, a judgment is made on whether the download reservation data can be changed to the recording reservation data. When judged as possible, the download reservation data can be changed to the recording reservation data. Accordingly, it is possible to change a reservation of a program whose recording reservation has been changed to the download reservation in the past because of the lack of a tuner due to the temporal overlap with another recording reservation or the insufficient free storage capacity for program accumulation, to the recording reservation without having to prompt the user to make such an operation. As a result, user-friendliness is improved.

The judgment means may judge whether the recording reservation of the designated broadcast program is possible based on at least a presence/absence of an overlap between a recording date/time of a broadcast program already set to the recording reservation and a recording date/time of the designated broadcast program.

Further, the judgment means may judge whether the recording reservation of the designated broadcast program is possible by comparing at least a free storage capacity of the storage section and a recording data size of the designated broadcast program.

The change means may judge whether the recording reservation of the designated broadcast program is possible based on at least a presence/absence of an overlap between a recording date/time of a broadcast program already set to the recording reservation and a recording date/time of the designated broadcast program.

The change means judges whether the recording reservation of the designated broadcast program is possible by comparing at least a free storage capacity of the storage section and a recording data size of the designated broadcast program.

According to another embodiment of the present invention, there is provided a program accumulation reservation method including: acquiring data of a broadcast program based on a preset recording reservation and accumulating the data in a storage section; acquiring data of a delivery program delivered by a downloading method via a network based on a preset download reservation and accumulating the data in the storage section; accepting a designation of the broadcast program to be set to the recording reservation, that has been made by a user; judging whether the recording reservation of the designated broadcast program is possible; and judging, when the recording reservation of the designated broadcast program is judged as being impossible, whether the download reservation of the delivery program of the same source as the broadcast program is possible, and setting the download reservation of the delivery program when judged that the download reservation is possible.

According to another embodiment of the present invention, there is provided a program causing a computer to function as a broadcast program acquisition means, a delivery program acquisition means, a storage section, a designation means, a judgment means, and a setting means. The broadcast program acquisition means acquires data of a broadcast program based on a preset recording reservation. The delivery program acquisition means acquires data of a delivery program delivered by a downloading method via a network based on a preset download reservation. The storage section accumulates one of the data of the broadcast program acquired by the broadcast program acquisition means and the data of the delivery program acquired by the delivery program acquisition means. The designation means accepts a designation of the broadcast program to be set to the recording reservation, that has been made by a user. The judgment means judges whether the recording reservation of the designated broadcast program is possible. The setting means judges, when the recording reservation of the designated broadcast program is judged as being impossible, whether the download reservation of the delivery program of the same source as the broadcast program is possible, and sets the download reservation of the delivery program when judged that the download reservation is possible.

As described above, according to the embodiments of the present invention, the number of times the recording reservations of programs need to be canceled can be reduced.

These and other objects, features and advantages of the present invention will become more apparent in light of the following detailed description of best mode embodiments thereof, as illustrated in the accompanying drawings.

BRIEF DESCRIPTION OF DRAWINGS

FIG. 4 is a diagram showing a structural example of DL-availability-information-attached EPG (Electronic Program Guide) data broadcast from a broadcasting station;

FIG. 5 is a diagram showing an example of an EPG display screen displayed on a display screen of an external AV device;

DESCRIPTION OF PREFERRED EMBODIMENTS

Hereinafter, embodiments of the present invention will be described with reference to the drawings.

Figure 1:
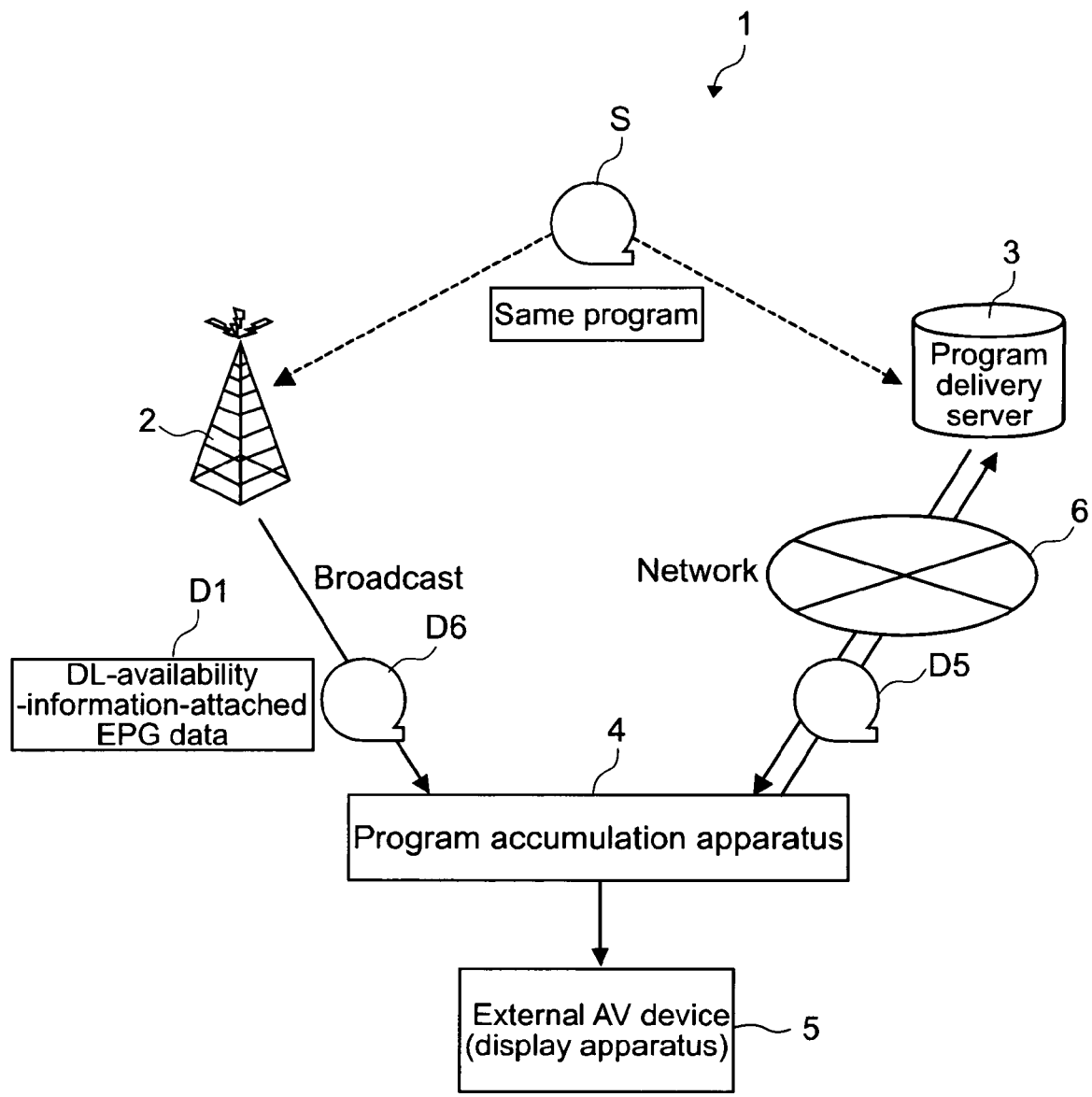
FIG. 1 is a diagram showing a structure of a program accumulation system according to a first embodiment of the present invention.

FIG. 1 is a diagram showing a program accumulation system 1 according to a first embodiment of the present invention.

As shown in the figure, the program accumulation system 1 includes a broadcasting station 2, a program delivery server 3, a program accumulation apparatus 4, and an external AV device 5. The program delivery server 3 and the program accumulation apparatus 4 are connectable via a network 6 such as the Internet. The program accumulation apparatus 4 may alternatively be connected to a home network connected to the network 6 such as the Internet via an edge router, for example. It should be noted that a reference symbol S denotes a program source, and the same program source S is provided to the broadcasting station 2 and the program delivery server 3. Upon acquiring the program source S, the broadcasting station 2 encodes the program source S into a code string appropriate for broadcast delivery to thus obtain broadcast program data D6, and delivers the broadcast program data D6 using broadcast waves. On the other hand, upon similarly acquiring the program source S, the program delivery server 3 encodes the program source S into a code string appropriate for delivery via the network 6, and delivers thus-obtained delivery program data D5.

The broadcasting station 2 delivers, using broadcast waves, the broadcast program data D6 and EPG (Electronic Program Guide) data D1 as guide information of that broadcast program. To the EPG data D1 broadcast from the broadcasting station 2, DL (Download) availability information that indicates whether the program can be delivered from the program delivery server 3 by a DL method is attached for each program. The DL-availability-information-attached EPG data will be described later in detail.

The program delivery server 3 is a server capable of delivering, to the program accumulation apparatus 4, the delivery program data D5 by the DL method via the network 6. In addition, the program delivery server 3 is capable of delivering at least the delivery program data D5 of programs of the same source as a part of the broadcast programs broadcast from the broadcasting station 2 by the DL method. Here, a program broadcast from the broadcasting station 2 will be referred to as "broadcast program", and a program delivered from the program delivery server 3 by the DL method will be referred to as "delivery program" for distinction.

The program accumulation apparatus 4 is capable of accumulating and reproducing the broadcast program data D6 and the delivery program data D5. The program accumulation apparatus 4 is also capable of, for example, acquiring the DL-availability-information-attached EPG data D1 broadcast from the broadcasting station 2, and use the data in broadcast program recording reservation processing, delivery program download reservation (hereinafter, referred to as "DL reservation") processing, and the like.

The external AV device 5 processes video data and audio data as reproduction data of a program output from the program accumulation apparatus 4 and provides the processed data to a user as visual information and auditory information.

Next, a structure of the program accumulation apparatus 4 will be described.

Figure 2:
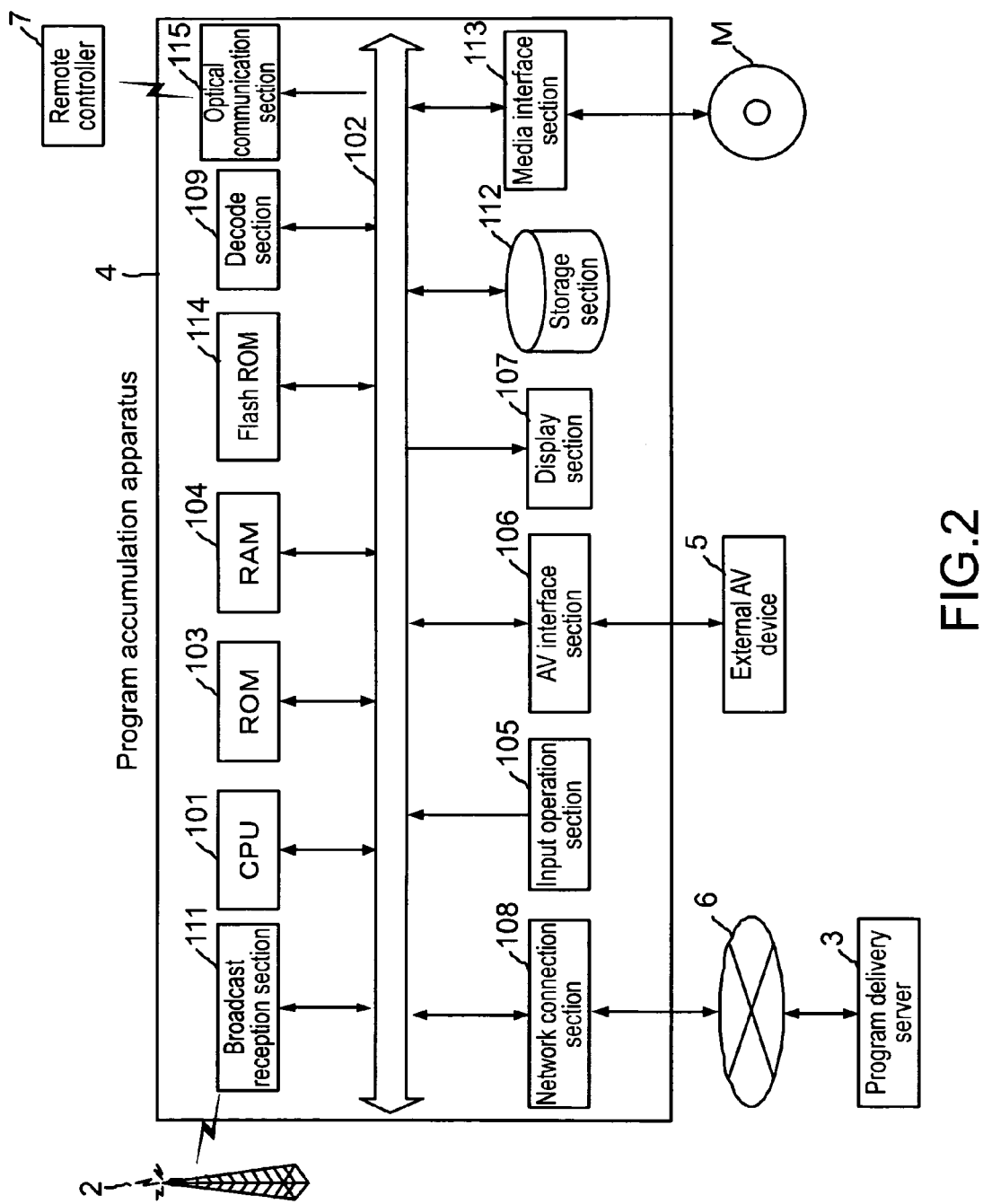
FIG. 2 is a diagram showing a hardware structure of a recording apparatus.

FIG. 2 is a diagram showing a hardware structure of the program accumulation apparatus 4.

As shown in the figure, connected to a CPU 101 through a system bus 102 are a ROM 103, a RAM 104, an input operation section 105, an AV interface section 106, a display section 107, a network connection section 108, a decode section 109, a broadcast reception section 111, a storage section 112 constituted of, for example, a hard disc drive (HDD), a media interface section 113, a flash ROM 114, an optical communication section 115, and the like.

The ROM 103 and the flash ROM 114 store programs and various types of data processed and executed by the CPU 101. The flash ROM 114 is capable of storing various types of data. The RAM 104 is used as a temporary working area and temporary data storage area for the CPU 101.

The input operation section 105 includes various keys and processes inputs of commands for various operations from the user. Commands that are input from the input operation section 105 are transmitted to the CPU 101 via the system bus 102.

The optical communication section 115 is an interface through which the program accumulation apparatus 4 communicates with a remote controller 7. The remote controller 7 includes various keys like the input operation section 105, and processes inputs of commands for various operations from the user, and transmits them after converting input signals thereof into optical signals. The optical communication section 115 receives the optical signals transmitted from the remote controller 7, converts the optical signals into electric signals, and outputs the electric signals to the CPU 101 via the system bus 102.

The display section 107 is constituted of a display device such as an LCD (Liquid Crystal Display) and a display control circuit that drives the display device. The display section 107 prompts the user to confirm commands and data that the user has input and displays various statuses, for example.

The network connection section 108 is an interface that processes, for example, the connection with the network 6 such as the Internet or the home network connected to the Internet through a router.

The AV interface section 106 processes inputs and outputs of video signals and audio signals with respect to the external AV device 5 such as a television set connected to the program accumulation apparatus 4.

The broadcast reception section 111 receives broadcast waves of, for example, terrestrial analog television broadcast, terrestrial digital television broadcast, CS digital broadcast, BS digital broadcast, and terrestrial digital television broadcast for mobile devices delivered from the broadcasting station 2, and performs demodulations of the video signals and audio signals and other processes.

The decode section 109 decodes program data that has been compression-encoded for transmission and recording. Video data, audio data, and the like that have been decoded and restored by the decode section 109 are output to the external AV device 5 such as a television set via the AV interface section 106.

The storage section 112 is constituted of, for example, an HDD, and stores data and an EPG of a program delivered from the broadcasting station 2 using broadcast waves, program data delivered from the program delivery server 3 by the DL method via the network 6, and the like.

The media interface section 113 is an interface in which a removable medium M such as a DVD (Digital Versatile Disc) and a Blu-ray disc is detachably loaded. The media interface section 113 is capable of recording and reproducing data of programs and the like onto and from the loaded removable medium M.

Figure 3:
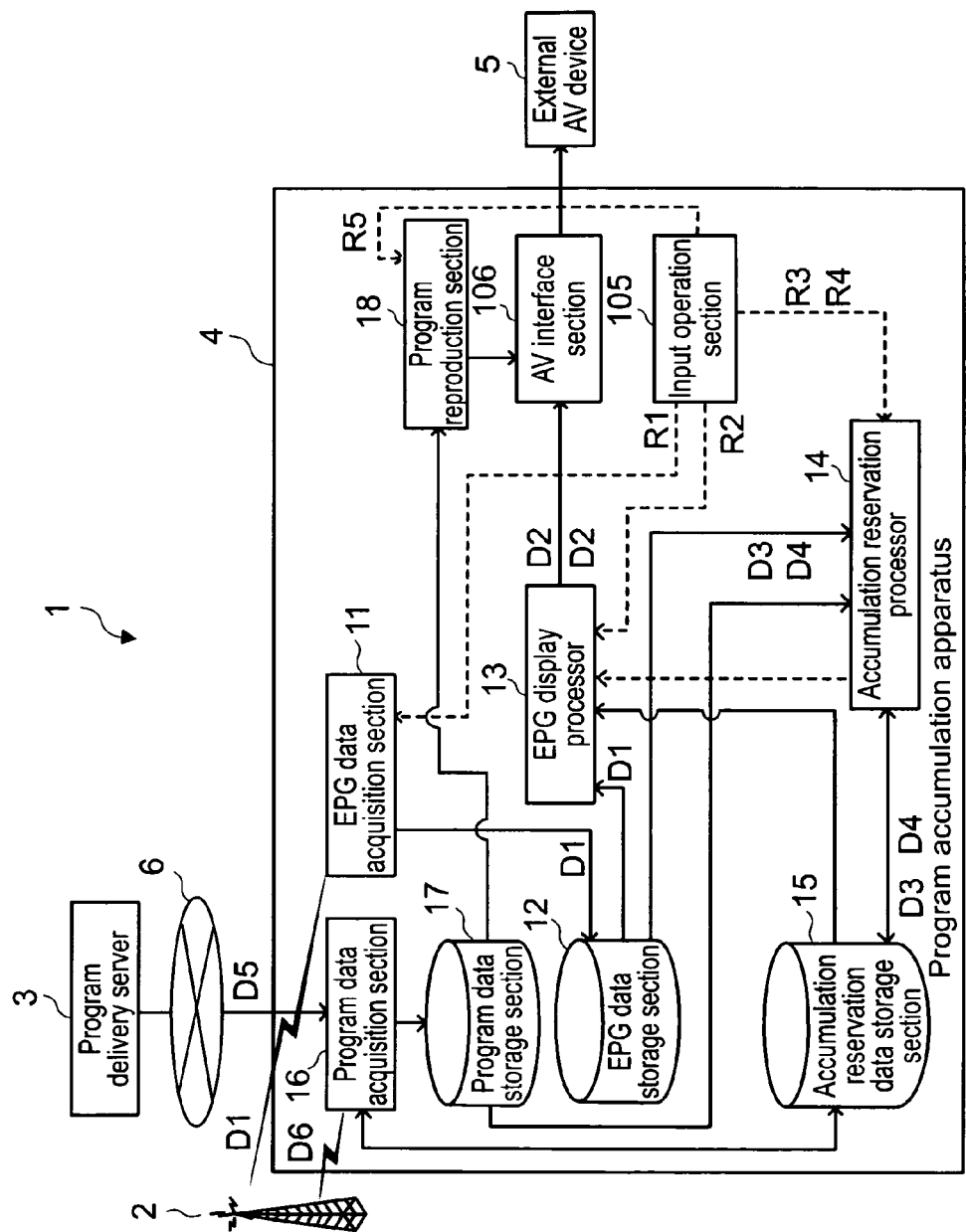
FIG. 3 is a diagram showing a functional structure of the recording apparatus.

FIG. 3 is a diagram showing a functional structure of the program accumulation apparatus 4.

The functional structure refers to a structure realized by the hardware shown in FIG. 2 and software.

As shown in the figure, the program accumulation apparatus 4 includes an EPG data acquisition section 11, an EPG data storage section 12, an EPG display processor 13, an accumulation reservation processor 14, an accumulation reservation data storage section 15, a program data acquisition section 16, a program data storage section 17, and a program reproduction section 18. Here, "DL" means "download".

With an EPG acquisition request R1 input by the user using the input operation section 105 or the remote controller 7 as a trigger, the EPG data acquisition section 11 acquires DL-availability-information-attached EPG data D1 transmitted from the broadcasting station 2 using broadcast waves, and stores the data in the EPG data storage section 12. Alternatively, it is possible for the EPG data acquisition section 11 to acquire the DL-availability-information-attached EPG data D1 periodically like every day or every week, and store the data in the EPG data storage section 12.

With an EPG display request R2 input by the user using the input operation section 105 or the remote controller 7 as a trigger, the EPG display processor 13 reads the DL-availability-information-attached EPG data D1 stored in the EPG data storage section 12, creates EPG display data D2 based on the read data, and causes the external AV device 5 to display the EPG display data D2 via the AV interface section 106.

The accumulation reservation processor 14 uses the EPG displayed on the display screen of the external AV device 5 to prompt the user to select a broadcast program to be set to the recording reservation using the input operation section 105 or the remote controller 7, and processes, when a recording reservation request R5 that requests the recording reservation of the selected broadcast program is input, the recording reservation and the DL reservation as follows.

Based on the DL availability information attached to the EPG data D1 and a result of judging an availability of the recording reservation of the broadcast program, the accumulation reservation processor 14 determines whether to acquire relevant broadcast program data D6 from the broadcasting station 2 as it is or change the recording reservation to the DL reservation so as to acquire delivery program data D5 of a program of the same source as the broadcast program from the program delivery server 3 by the DL method. When determined to acquire the broadcast program data D6 from the broadcasting station 2 as it is to thus record it in the storage section 112, the accumulation reservation processor 14 extracts information on a broadcast channel, a program ID, a broadcast date/time (broadcast start date/time and broadcast end date/time), and the like necessary for the recording reservation of the broadcast program from the EPG data D1 stored in the EPG data storage section 12 to thus generate recording reservation data D3, and registers the data in the accumulation reservation data storage section 15. On the other hand, when determined to acquire the delivery program data D5 of the program of the same source as the broadcast program from the program delivery server 3 by the DL method to thus store it in the storage section 112, the accumulation reservation processor 14 extracts location information and information on a DL available time and the like of the delivery program data D5 of the program to be downloaded, that are necessary for the DL reservation of the delivery program, from the EPG data D1 stored in the EPG data storage section 12 to thus generate DL reservation data D4, and registers the data in the accumulation reservation data storage section 15.

The program data acquisition section 16 acquires the broadcast program data D6 based on the recording reservation data D3 registered in the accumulation reservation data storage section 15, and records the data in the program data storage section 17. Moreover, the program data acquisition section 16 acquires the delivery program data D5 based on the DL reservation data D4 registered in the accumulation reservation data storage section 15, and stores the data in the program data storage section 17.

With a program viewing request R5 input by the user using the input operation section 105 or the remote controller 7 as a trigger, the program reproduction section 18 reads one relevant piece of program data recorded in the program data storage section 17, decodes the read data using the decode section 109, and outputs video data, audio data, and the like as reproduction data to the AV interface section 106.

FIG. 4 is a diagram showing a structural example of the DL-availability-information-attached EPG data D1.

The DL-availability-information-attached EPG data D1 contains guide information of a plurality of programs. The guide information of each program contains, as shown in the figure, information on a "program ID", a "program name", a "broadcast start date/time", a "broadcast end date/time", a "channel", a "DL-available date/time", a "bit rate", a "DL source URL (Uniform Resource Locator)", "thumbnail information", and "details". Here, the "DL-available date/time" and the "DL source URL" are used as DL availability information. The "DL-available date/time" is a date/time on/at which a delivery (download) of the delivery program data D5 of the program of the same source as the broadcast program from the program delivery server 3 becomes possible. The "DL source URL" is location information such as a URL indicating an address of a file of program data to be downloaded. Significant information is set to each of the "DL-available date/time" and the "DL source URL" of a delivery program of the same source as a certain broadcast program, whose delivery program data D5 can be delivered from the program delivery server 3 by the DL method, and insignificant information exemplified by NULL is set to each of the "DL-available date/time" and the "DL source URL" of a delivery program of the same source as a certain broadcast program, that cannot be delivered from the program delivery server 3 by the DL method.

Next, an operation of the program accumulation system 1 will be described.

Upon receiving an EPG acquisition request R1 from the input operation section 105 or the remote controller 7, the EPG data acquisition section 11 acquire the DL-availability-information-attached EPG data D1 delivered from the broadcasting station 2 using broadcast waves, and stores the data in the EPG data storage section 12.

Upon receiving an EPG display request R2 from the input operation section 105 or the remote controller 7, the EPG display processor 13 reads the DL-availability-information-attached EPG data D1 stored in the EPG data storage section 12, generates EPG display data D2 based on the DL-availability-information-attached EPG data D1, and outputs the generated data to the external AV device 5 via the AV interface section 106. Accordingly, the EPG is displayed on the display screen of the external AV device 5.

FIG. 5 is a diagram showing an example of an EPG display screen.

As shown in the figure, the EPG display screen includes a plurality of program information display areas 21 for displaying guide information of individual programs A to I. The program information display areas 21 of the individual programs A to I are arranged in a two-dimensional space constituted of an ordinate axis representing a broadcast time (period) and an abscissa axis representing a channel. Display information 20 (identifier) such as character string information exemplified by "DL" or pictorial information is appended to the program information display area 21 of each program that can be delivered by the DL method. The example in the figure shows that programs A, D, E, and F are programs that can be delivered by the DL method, and programs B, C, G, H, and I are programs that cannot be delivered by the DL method.

Subsequent operations will be described while assuming that the user has selected the program A as a target for an accumulation reservation on the EPG display screen.

In this case, designation information of the program A is input to the EPG display processor 13 from the input operation section 105 or the remote controller 7. Upon input of the designation information of the program A, the EPG display processor 13 extracts guide information of the designated program A from the DL-availability-information-attached EPG data D1 stored in the EPG data storage section 12, generates display data D2' of a program-details display screen based on the DL-availability-information-attached EPG data D1, and outputs the data to the external AV device 5 via the AV interface section 106. Accordingly, the program-details display screen as follows is displayed on the display screen of the external AV device 5.

Figure 6:
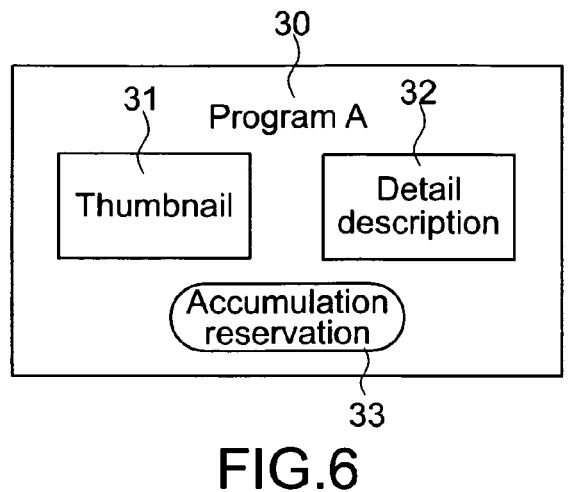
FIG. 6 is a diagram showing an example of a program-detail display screen.

FIG. 6 is a diagram showing an example of the program-details display screen.

As shown in the figure, the program-details display screen displays a program name 30, a thumbnail 31 as a contracted still image of a program, a detail description 32 on a program content, and an accumulation reservation button 33.

On the program-details display screen, the program name 30 indicates a program name of a broadcast program designated by the user as a target for the accumulation reservation. The thumbnail 31 shows a contracted still image of the broadcast program. The detail description 32 shows a detail description on a content of the broadcast program. The accumulation reservation button 33 is a button used for prompting the user to input execution of the recording reservation of the broadcast program.

Here, upon selection of the accumulation reservation button 33 shown in FIG. 6 by the user using the input operation section 105 or the remote controller 7, the accumulation reservation processor 14 executes program accumulation reservation processing as follows.

Figure 7:
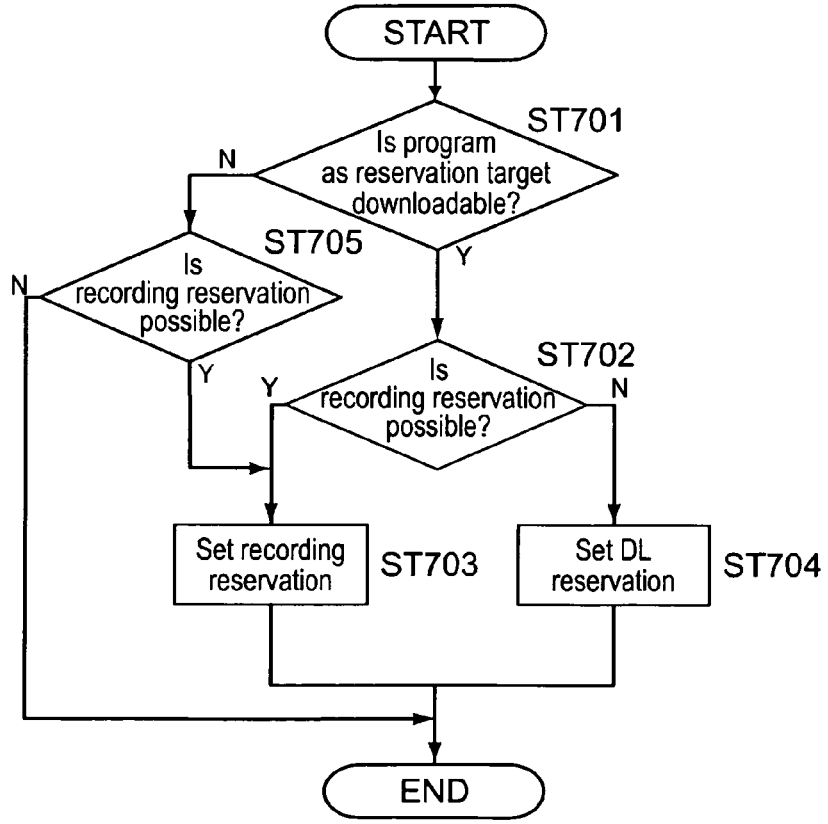
FIG. 7 is a flowchart showing an operation of accumulation reservation processing of the recording apparatus.

FIG. 7 is a flowchart showing an operation of the program accumulation reservation processing of the program accumulation apparatus 4.

First, the accumulation reservation processor 14 judges whether delivery program data D5 of a program of the same source as a broadcast program designated by the user as a target for the recording reservation on the EPG display screen of FIG. 5 can be delivered by the DL method (ST 701). In other words, the accumulation reservation processor 14 judges whether significant data is set to both the "DL-available date/time" and the "DL source URL" of EPG data of the broadcast program as the target for the recording reservation out of the DL-availability-information-attached EPG data D1 stored in the EPG data storage section 12, and if set, judges that the delivery program data D5 of the program of the same source as the broadcast program can be delivered by the DL method. If the significant data is not set, the accumulation reservation processor 14 judges that the delivery program data D5 of the program of the same source as the broadcast program cannot be delivered by the DL method.

When judging that the delivery program data D5 of the program of the same source as the broadcast program as the target for the recording reservation can be delivered by the DL method (Y in ST 701), the accumulation reservation processor 14 next judges whether the broadcast program can be set to the recording reservation (ST 702). Here, the judgment on whether the broadcast program can be set to the recording reservation is carried out as follows, for example.

The accumulation reservation processor 14 reads out, from the DL-availability-information-attached EPG data D1, a bit rate, a broadcast start date/time, and a broadcast end date/time of the broadcast program as the target for the recording reservation. Next, the accumulation reservation processor 14 calculates a broadcast time period based on the broadcast start date/time and the broadcast end date/time, and calculates a recording data size of the broadcast program based on the broadcast time period, the bit rate, a recording mode (recording image quality level) selected by the user at a time of setting the recording reservation, and the like. Next, the accumulation reservation processor 14 compares the recording data size and a "free storage capacity that can be used for program accumulation (hereinafter, referred to as "free storage capacity for program accumulation")" of the storage section 112, and judges whether the recording data size is equal to or smaller than the free storage capacity for program accumulation. The free storage capacity for program accumulation used herein is, for example, a capacity obtained by subtracting, from the free storage capacity of the storage section 112, a capacity predicted to be consumed by the broadcast program data D6 of the program already set to the recording reservation and the delivery program data D5 of the program set to the DL reservation.

When the recording data size is not equal to or smaller than the free storage capacity for program accumulation, the accumulation reservation processor 14 judges that the broadcast program as the target for the recording reservation cannot be set to the recording reservation, generates DL reservation data D4 that sets delivery program data of a program of the same source as the broadcast program as a target for the DL reservation, and registers the data in the accumulation reservation data storage section 15 (ST 704).

On the other hand, when judging that the data size is equal to or smaller than the free storage capacity for program accumulation of the storage section 112, the accumulation reservation processor 14 next judges whether the broadcast program can be set to the recording reservation based on an availability of a tuner. In other words, the accumulation reservation processor 14 compares a recording date/time (recording start date/time and recording end date/time) of the recording reservation data D3 of the broadcast program already set to the recording reservation, that is already stored in the accumulation reservation data storage section 15, and a recording date/time (recording start date/time and recording end date/time) of a broadcast program currently a target for the recording reservation, and judges whether the recording dates/times overlap.

When judging that the recording date/time of the broadcast program already set to the recording reservation does not overlap the recording date/time of the broadcast program currently the target for the recording reservation, the accumulation reservation processor 14 judges that the broadcast program currently the target for the recording reservation is a broadcast program that can be set to the recording reservation (Y in ST 702). Thus, the accumulation reservation processor 14 registers the recording reservation data D3 of the broadcast program in the accumulation reservation data storage section 15 (ST 703). As a result, the recording reservation of the broadcast program is set.

It should be noted that this example assumes a case where a tuner of the broadcast reception section 111 can only receive broadcast waves of a single channel at a time. In a case where the tuner is capable of receiving broadcast waves of a plurality of channels at the same time, a condition for judging that the broadcast program currently the target for the recording reservation is a broadcast program that can be set to the recording reservation becomes "unless the number of temporal overlaps between the recording dates/times does not exceed the number of channels of the tuner".

On the other hand, when judging that the recording date/time of the broadcast program already set to the recording reservation overlaps the recording date/time of the broadcast program currently the target for the recording reservation, the accumulation reservation processor 14 judges that the broadcast program that is currently the target for the recording reservation is a program that cannot be set to the recording reservation (N in ST 702). Thus, the accumulation reservation processor 14 generates DL reservation data D4 that sets delivery program data D5 of a program of the same source as the broadcast program as a target for the DL reservation, and registers the data in the accumulation reservation data storage section 15 (ST 704).

When judging in ST 701 that the delivery program data D5 of the program of the same source as the broadcast program as the target for the recording reservation cannot be delivered by the DL method (N in ST 701), the accumulation reservation processor 14 judges whether the broadcast program as the target for the recording reservation can be set to the recording reservation as in ST 702 (ST 705). When judging as a result that the broadcast program as the target for the recording reservation can be set to the recording reservation (Y in ST 705), the accumulation reservation processor 14 advances to ST 703 to generate recording reservation data D3 of the broadcast program, and registers the data in the accumulation reservation data storage section 15 (ST 703). When judging that the broadcast program as the target for the recording reservation cannot be set to the recording reservation (N in ST 705), the accumulation reservation processor 14 carries out error processing such as displaying a message indicating that the program is an unaccumulative program that can neither be set to the recording reservation nor the DL reservation on the display screen of the external AV device 5, and ends the program accumulation reservation processing.

Figures 8, 9:
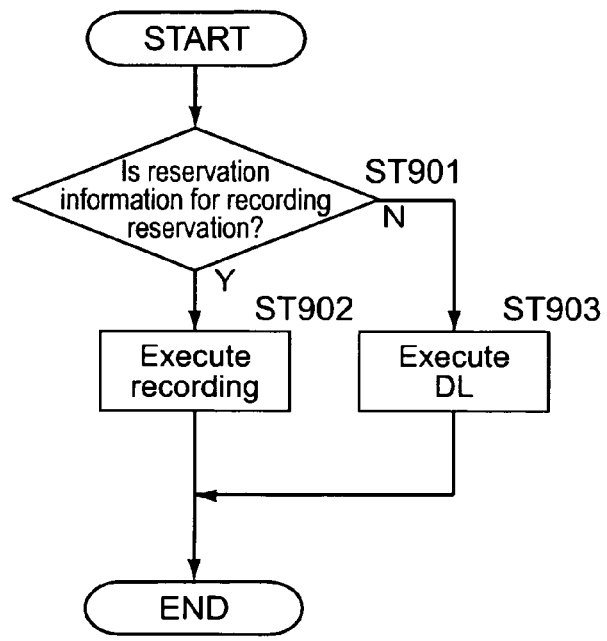
FIG. 8 is a diagram showing a structural example of recording reservation data and DL (Download) reservation data stored in an accumulation reservation data storage section.
FIG. 9 is a flowchart showing an operation of accumulating a program based on a recording reservation and a DL reservation.

FIG. 8 is a diagram showing a structural example of the recording reservation data D3 and the DL reservation data D4 stored in the accumulation reservation data storage section 15.

As shown in the figure, the recording reservation data D3 contains information on a "program ID", a "program name", a "recording start date/time", a "recording end date/time", a "channel", and the like. The DL reservation data D4 contains information on a "program ID", a "program name", a "DL-available date/time", a "DL source URL", and the like. Here, if the source S is the same for the broadcast program delivered from the broadcasting station 2 and the delivery program delivered from the program delivery server 3, the program IDs thereof as information for specifying a program are the same.

Next, a program accumulation operation will be described.

FIG. 9 is a flowchart showing the program accumulation operation that is based on the recording reservation and the DL reservation.

With a new registration of the recording reservation data D3 or the DL reservation data D4 in the accumulation reservation data storage section 15 as a trigger, the program data acquisition section 16 references the newly-registered recording reservation data D3 or DL reservation data D4. Upon detecting that the recording reservation data D3 has been newly registered in the accumulation reservation data storage section 15 (Y in ST 901), the program data acquisition section 16 records a broadcast program based on the detected recording reservation data D3 (ST 902). In other words, the program data acquisition section 16 compares the "recording start date/time" of the recording reservation data D3 and the current date/time, and when the "recording start date/time" and the current date/time match, acquires the broadcast program data D6 thereof and stores it in the storage section 112.

On the other hand, when detecting that the DL reservation data D4 of a delivery program has been newly registered in the accumulation reservation data storage section 15 (N in ST 901), the program data acquisition section 16 downloads the delivery program data D5 thereof based on the DL reservation data D4 (ST 903). In other words, the program data acquisition section 16 compares the "DL-available date/time" of the DL reservation data D4 and the current date/time, and when the "DL-available date/time" and the current date/time match, acquires the delivery program data D5 thereof by download and stores it in the storage section 112.

As descried above, according to this embodiment, even when the recording reservation of the designated broadcast program cannot be set due to a temporal overlap with another recording reservation or an insufficient free storage capacity for program accumulation of the storage section 112, if data of a delivery program of the same source as the broadcast program can be delivered by the DL method, by setting the DL reservation of that delivery program, data of the entire program can be acquired fully and accumulated.

Here, a specific operational example in a case of setting a recording reservation of a broadcast program having a part that temporally overlaps the broadcast program already set to the recording reservation will be described. It is assumed that, when the broadcast program A of Channel 1 is already set to the recording reservation in FIG. 5, the broadcast program D of Channel 2 is newly set to the recording reservation. Here, the broadcast program D is a program of the same source as the delivery program whose delivery program data D5 can be delivered by the DL method. It should be noted that in this case, it is assumed that the program accumulation apparatus 4 includes a sufficient free storage capacity for program accumulation but is incapable of receiving broadcast programs of a plurality of channels at the same time due to restrictions of the tuner of the broadcast reception section 111.

In this case, based on the DL-availability-information-attached EPG data D1, the accumulation reservation processor 14 judges that the broadcast program D can be delivered by the DL method in ST 701 of FIG. 7 (Y in ST 701). Next, the accumulation reservation processor 14 judges that the broadcast program D cannot be set to the recording reservation due to a lack of a tuner attributable to the partial temporal overlap between the recording dates/times of the broadcast program A and the broadcast program D (N in ST 702). At this time, even when the broadcast program D cannot be set to the recording reservation, since the delivery program of the same source as the broadcast program D can be delivered by the DL method, the accumulation reservation processor 14 sets the DL reservation for acquiring and accumulating the delivery program data D5 of the program of the same source as the broadcast program D from the program delivery server 3 by the DL method (ST 704). As a result, instead of recording the broadcast program D, the program accumulation apparatus 4 can acquire the delivery program data D5 of the program of the same source as the broadcast program D from the program delivery server 3 by the DL method, and accumulate the data in the storage section 112.

Next, a second operational example in a case of setting a recording reservation of a broadcast program having a part that temporally overlaps the broadcast program already set to the recording reservation will be described in detail. It is assumed that, when the broadcast program A of Channel 1 is already set to the recording reservation in FIG. 5, the broadcast program G of Channel 3 is newly set to the recording reservation. Here, the broadcast program G is a program of the same source as the delivery program whose delivery program data D5 cannot be delivered by the DL method. It should be noted that in this case, it is assumed that the program accumulation apparatus 4 includes a sufficient free storage capacity for program accumulation but is incapable of receiving broadcast programs of a plurality of channels at the same time due to restrictions of the tuner of the broadcast reception section 111.

In this case, based on the DL-availability-information-attached EPG data D1, the accumulation reservation processor 14 judges that the broadcast program G cannot be delivered by the DL method in ST 701 of FIG. 7 (N in ST 701). Next, the accumulation reservation processor 14 judges that the broadcast program G cannot be set to the recording reservation due to the partial temporal overlap between the recording dates/times of the broadcast program A and the broadcast program G (N in ST 705). As a result, the accumulation reservation processor 14 carries out error processing such as displaying a message indicating that the broadcast program G as a new target for the recording reservation is a program that can neither be set to the recording reservation nor the DL reservation on the display screen of the external AV device 5, and ends the program accumulation reservation processing.

Next, an example of an operation carried out in a case where, when the user is trying the set a recording reservation of a broadcast program, a sufficient free storage capacity for program accumulation is not left in the storage section 112 for recording the broadcast program data D6 thereof will be described. For example, with a data size of the broadcast program A as 100 MB, a data size of the broadcast program E as 100 MB, and the free storage capacity for program accumulation of the storage section 112 as 150 MB, the broadcast program A and the broadcast program E are set to the recording reservation in the stated order. It should be noted that the broadcast program A and the broadcast program E are not temporally overlapped with the broadcast program already set to the recording reservation. Moreover, the delivery program data D5 of programs of the same sources as the broadcast program A and the broadcast program E can both be delivered from the program delivery server 3 by the DL method.

In this case, after judging that the delivery program data D5 of the program of the same source as the broadcast program A as the target for the recording reservation can be delivered by the DL method based on the DL-availability-information-attached EPG data D1 (Y in ST 701), the accumulation reservation processor 14 judges that the recording of the broadcast program A as the target for the recording reservation is possible in terms of the availability of the tuner and the free storage capacity for program accumulation (Y in ST 702). As a result, the accumulation reservation processor 14 sets the recording reservation of the broadcast program A (ST 703).

By recording the broadcast program A, the free storage capacity for program accumulation of the storage section 112 is reduced that much. In this operational example, since the data size of the broadcast program A is 100 MB and the free storage capacity for program accumulation of the storage section 112 is 150 MB, the free storage capacity for program accumulation of the storage section 112 becomes 50 MB after the broadcast program A is recorded. Accordingly, from the reason that the broadcast program E having the data size of 100 MB, that is a subsequent target for the recording reservation, is larger than the free storage capacity for program accumulation of the storage section 112, the accumulation reservation processor 14 judges that the broadcast program E is a program that cannot be set to the recording reservation (N in ST 702). However, since the delivery program data D5 of a program of the same source as the broadcast program E can be delivered from the program delivery server 3 by the DL method, the accumulation reservation processor 14 sets the DL reservation for acquiring and accumulating the delivery program data D5 of the program of the same source as the broadcast program E from the program delivery server 3 by the DL method (ST 704).

After that, when judged that the free storage capacity for program accumulation of the storage section 112 has become larger than the data size of the delivery program of the same source as the broadcast program E, that has been set to the DL reservation, since, for example, viewed program data has been deleted from the storage section 112, and that the "DL-available date/time" of the DL reservation data D4 of the delivery program of the same source as the broadcast program E stored in the accumulation reservation data storage section 15 has matched the current date/time, the program data acquisition section 16 transmits a DL request for data of the delivery program of the same source as the broadcast program E to the program delivery server 3. Then, the program data acquisition section 16 receives the delivery program data D5 of the delivery program of the same source as the broadcast program E, that has been delivered from the program delivery server 3 by the DL method, and stores the data in the program data storage section 17 (ST 903).

It should be noted that in a case where the free storage capacity for program accumulation of the storage section 112 does not exceed the data size of the delivery program of the same source as the broadcast program E even when reaching the "DL-available date/time" of the delivery program of the same source as the broadcast program E, that has been set to the DL reservation, a message indicating that the delivery program of the same source as the broadcast program E cannot be downloaded is displayed on the display screen of the external AV device 5 so as to be presented to the user.

Next, a description will be given on reservation data change processing carried out when the recording reservation data D3 or the DL reservation data D4 is deleted from the accumulation reservation data storage section 15. The deletion of the recording reservation data D3 or the DL reservation data D4 is not only carried out by the user, but is also carried out upon completion of the recording or download of program data based on the reservation.

Figure 10:
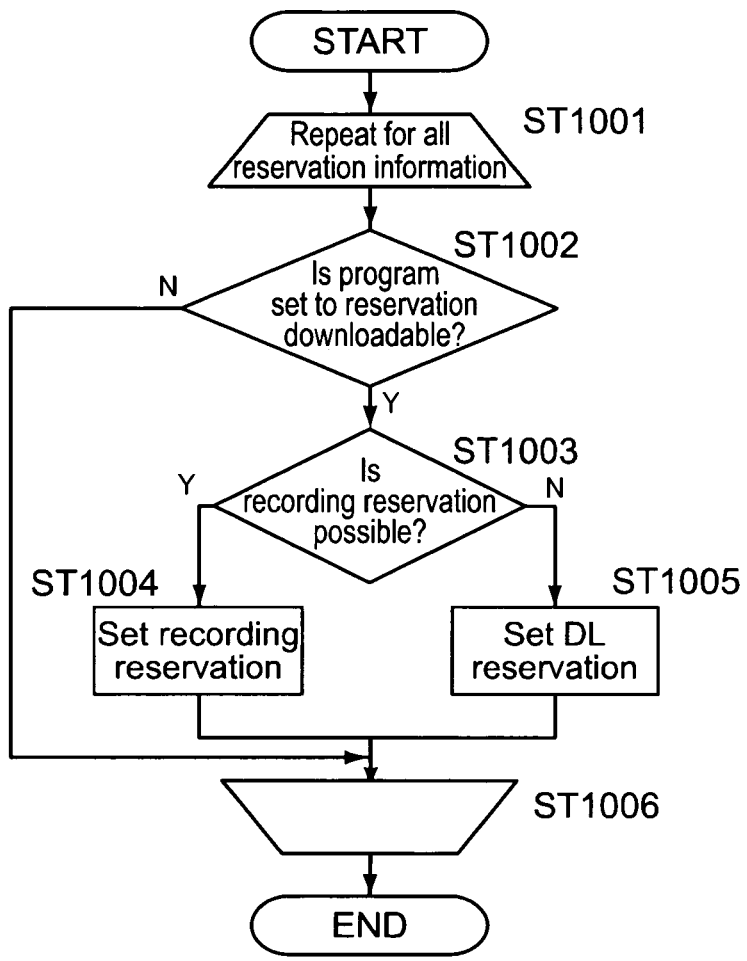
FIG. 10 is a flowchart showing reservation data change processing.

FIG. 10 is a flowchart showing the reservation data change processing.

First, the accumulation reservation processor 14 extracts the recording reservation data D3 or the DL reservation data D4 registered at the top of the accumulation reservation data storage section 15 and judges whether a program as a target for the accumulation reservation can be delivered by the DL method based on the DL-availability-information-attached EPG data D1 (ST 1002). It should be noted that the recording reservation data D3 or the DL reservation data D4 registered at the top of the accumulation reservation data storage section 15 is reservation data having earliest broadcast date/time or DL-available date/time among both the recording reservation data D3 and the DL reservation data D4.

When the program as the target for the accumulation reservation cannot be delivered by the DL method (N in ST 1002), since reservation data of the program as the target for the accumulation reservation is recording reservation data D3 of a broadcast program that can only be acquired from the broadcasting station 2 through broadcast waves, the accumulation reservation processor 14 leaves the recording reservation data D3 registered in the accumulation reservation data storage section 15 as it is (without change) and shifts to a process with respect to the recording reservation data D3 or the DL reservation data D4 registered next in the accumulation reservation data storage section 15.

Further, when judging that the program as the target for the accumulation reservation can be delivered by the DL method (Y in ST 1002), the accumulation reservation processor 14 next judges whether a broadcast program corresponding to the program as the target for the accumulation reservation is a broadcast program that can be set to the recording reservation as follows (ST 1003).

Specifically, the accumulation reservation processor 14 first reads out, from the DL-availability-information-attached EPG data D1, the bit rate, the broadcast start date/time, and the broadcast end date/time of the broadcast program. Next, the accumulation reservation processor 14 calculates the broadcast time period based on the broadcast start date/time and the broadcast end date/time, and calculates a recording data size of the broadcast program based on the broadcast time period, the bit rate, a recording mode (recording image quality level) selected by the user at a time of setting the recording reservation, and the like. Then, the accumulation reservation processor 14 compares the recording data size and the free storage capacity for program accumulation of the storage section 112, and judges whether the recording data size is equal to or smaller than the free storage capacity for program accumulation.

When the recording data size is not equal to or smaller than the free storage capacity for program accumulation, the accumulation reservation processor 14 judges that the broadcast program cannot be set to the recording reservation. On the other hand, when judging that the recording data size is equal to or smaller than the free storage capacity for program accumulation, the accumulation reservation processor 14 next judges whether the broadcast program can be set to the recording reservation based on the availability of the tuner. In other words, the accumulation reservation processor 14 compares a recording date/time (recording start date/time and recording end date/time) of the recording reservation data D3 of the broadcast program already set to the recording reservation, that is already stored in the accumulation reservation data storage section 15, and a recording date/time (recording start date/time and recording end date/time) of a broadcast program currently a target for the recording reservation, and judges whether the recording dates/times overlap.

When judging that the recording date/time of the broadcast program already set to the recording reservation does not overlap the recording date/time of the broadcast program currently the target for the recording reservation, the accumulation reservation processor 14 judges that the broadcast program currently the target for the recording reservation is a broadcast program that can be set to the recording reservation.

When judging by the above judgment that the program as the target for the accumulation reservation can be set to the recording reservation (Y in ST 1003), the accumulation reservation processor 14 judges that reservation data of the program as the target for the accumulation reservation should be recording reservation data D3 of a broadcast program. Here, if the reservation data of the program as the target for the accumulation reservation is originally the recording reservation data D3, the accumulation reservation processor 14 leaves the recording reservation data D3 as it is (without change), and if the reservation data of the program as the target for the accumulation reservation is originally the DL reservation data D4, the accumulation reservation processor 14 changes the DL reservation data D4 to the recording reservation data D3 (ST 1004). After that, the accumulation reservation processor 14 shifts to a process with respect to the recording reservation data D3 or the DL reservation data D4 registered next in the accumulation reservation data storage section 15.

When judged in ST 1003 that the program as the target for the accumulation reservation cannot be set to the recording reservation (N in ST 1003), the accumulation reservation processor 14 judges that reservation data of the program as the target for the accumulation reservation should be DL reservation data D4 of a delivery program. Here, if the reservation data of the program as the target for the accumulation reservation is originally the recording reservation data D3, the accumulation reservation processor 14 changes the recording reservation data D3 to the DL reservation data D4, and if the reservation data of the program as the target for the accumulation reservation is originally the DL reservation data D4, the accumulation reservation processor 14 leaves the DL reservation data D4 as it is (ST 1005). After that, the accumulation reservation processor 14 shifts to the process with respect to the recording reservation data D3 or the DL reservation data D4 registered next in the accumulation reservation data storage section 15 (ST 1006).

The same processes as above are repeated for all the recording reservation data D3 and the DL reservation data D4 registered in the accumulation reservation data storage section 15 (ST 1001 to ST 1006).

As described above, in this embodiment, with the deletion of the recording reservation data D3 or the DL reservation data D4 from the accumulation reservation data storage section 15 due to the cancel of the recording reservation or the download reservation as a trigger, in prospect of a change in availability of the tuner and an amount of increase of the free storage capacity for program accumulation, a judgment is made on whether the download reservation data D4 stored in the accumulation reservation data storage section 15 can be changed to the recording reservation data D3. When judged as possible, the download reservation data D4 can be changed to the recording reservation data D3. Accordingly, it is possible to change a reservation of a program whose recording reservation has been changed to the download reservation in the past because of a lack of the tuner due to the temporal overlap with another recording reservation or an insufficient free storage capacity for program accumulation, to the recording reservation without having to prompt the user to make such an operation. As a result, user-friendliness is improved.

Incidentally, in the above embodiment, when the broadcast program cannot be set to the recording reservation, the DL reservation of a delivery program of the same source as the broadcast program has been set. However, it is also possible to set the recording reservation of the broadcast program within a time range in which the tuner can be used and also set the DL reservation of the delivery program of the same source as the broadcast program at the same time.

Further, the above embodiment has shown the operation of changing the DL reservation data D4 stored in the accumulation reservation data storage section 15 to the recording reservation data D3 when the recording reservation data D3 or the DL reservation data D4 is deleted from the accumulation reservation data storage section 15. However, it is also possible that, also when a content of the recording reservation data D3 or the DL reservation data D4 registered in the accumulation reservation data storage section 15 is updated, for example, when the channel, the date/time, the bit rate, the recording mode, or the like is changed, a judgment is made on whether the DL reservation data D4 stored in the accumulation reservation data storage section 15 can be changed to the recording reservation data D3, and if possible, the DL reservation data D4 is changed to the recording reservation data D3.

Second Embodiment

Next, a second embodiment of the present invention will be described.

Figure 11:
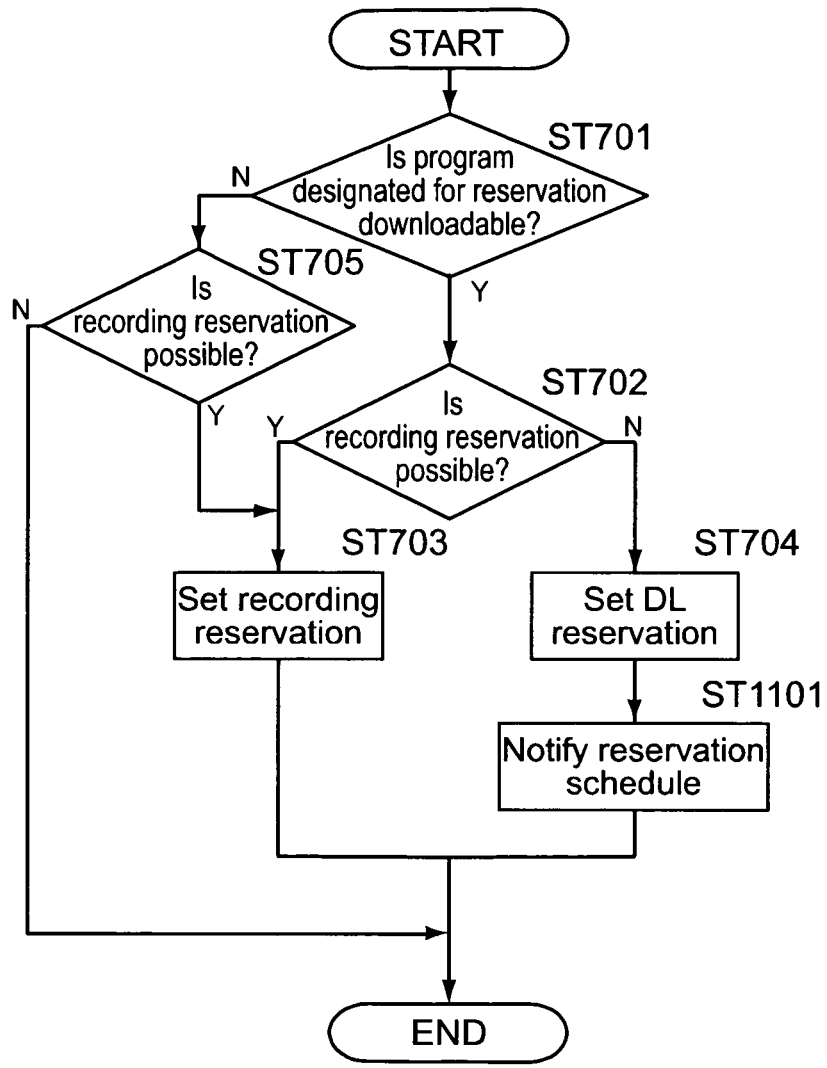
FIG. 11 is a flowchart showing accumulation reservation processing in a recording apparatus according to a second embodiment of the present invention.

FIG. 11 is a flowchart showing program accumulation reservation processing of the program accumulation apparatus 4 according to the second embodiment.

The program accumulation reservation processing of this embodiment shown in FIG. 11 is different from that in the flowchart of the first embodiment shown in FIG. 7 in that ST 1101 is added.

After the DL reservation of the delivery program is set in ST 704, the accumulation reservation processor 14 outputs, to the EPG display processor 13, a command to display the DL-available date/time of the delivery program set to the DL reservation. Upon receiving the DL-available date/time display command, the EPG display processor 13 reads the "DL-available date/time" of the delivery program set to the DL reservation from the DL-availability-information-attached EPG data D1 stored in the EPG data storage section 12, and causes the "DL-available date/time" to be displayed on the display screen of the external AV device 5 via the AV interface section 106.

By executing the processing as described above, the user is capable of grasping when the delivery program set to the DL reservation is to be downloaded or will become downloadable.

Third Embodiment

Next, a third embodiment of the present invention will be described.

In this embodiment, the program-details display screen displayed on the display screen of the external AV device 5 when a broadcast program as a target for the recording reservation is designated by the user on the EPG display screen shown in FIG. 5 is different from that of the above embodiments.

Figure 12:
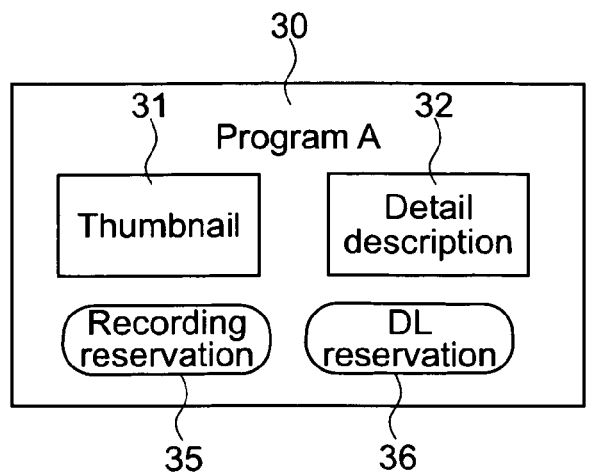
FIG. 12 is a diagram showing a program-detail display screen according to a third embodiment of the present invention.

FIG. 12 is a diagram showing another example of the program-details display screen.

As show in the figure, the program-details display screen is provided with, in addition to the program name 30, the thumbnail 31 as a contracted still image of a program, and the detail description 32 on a program content, a recording reservation button 35 and a DL reservation button 36 in place of the accumulation reservation button 33 shown in FIG. 6. The recording reservation button 35 is a button for prompting the user to designate execution of a recording reservation of a broadcast program. When the recording reservation button 35 is operated by a mouse click operation or the like, the accumulation reservation processor 14 executes the program accumulation reservation processing described with reference to FIG. 7. Meanwhile, the DL reservation button 36 is a button for prompting the user to designate execution of a DL reservation of a delivery program delivered from the program delivery server 3 by the DL method. When the DL reservation button 36 is operated by a mouse click operation or the like, the accumulation reservation processor 14 executes second program accumulation reservation processing described below instead of the program accumulation reservation processing described with reference to FIG. 7.

Figure 13:
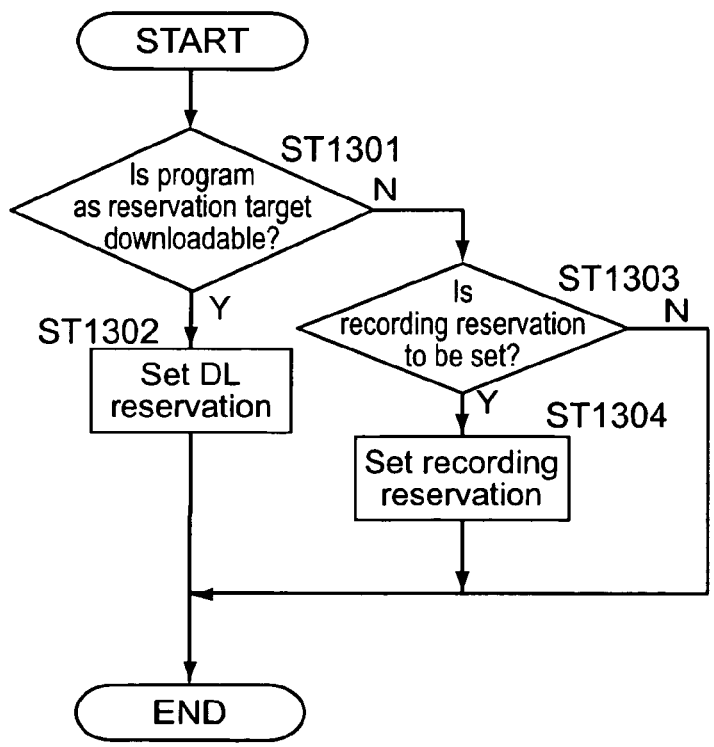
FIG. 13 is a flowchart showing second program accumulation reservation processing.

FIG. 13 is a flowchart showing the second program accumulation reservation processing.

Upon detecting that the DL reservation button 36 has been operated by a mouse click operation or the like, the accumulation reservation processor 14 judges whether a program as a target for the reservation can be delivered by the DL method based on the DL-availability-information-attached EPG data D1 stored in the EPG data storage section 12 (ST 1301). When judging that the program as the target for the reservation can be delivered by the DL method (Y in ST 1301), the accumulation reservation processor 14 generates DL reservation data D4 of the program as the target for the reservation and registers the data in the accumulation reservation data storage section 15 (ST 1302).

On the other hand, when judging that the program as the target for the reservation cannot be delivered from the program delivery server 3 by the DL method (N in ST 1301), the accumulation reservation processor 14 causes the external AV device 5 to display on the display screen thereof a selection screen for prompting the user to select whether to execute the recording reservation of the broadcast program of the same source as the program as the target for the reservation. Based on selection information input by the user on the selection screen, the accumulation reservation processor 14 judges whether to execute the recording reservation of the broadcast program (ST 1303). When judging that the user has selected to execute the recording reservation of the broadcast program (Y in ST 1303), the accumulation reservation processor 14 registers the recording reservation data D3 of the broadcast program in the accumulation reservation data storage section 15 (ST 1304). On the other hand, upon judging that the user has selected not to execute the recording reservation of the broadcast program (N in ST 1303), the accumulation reservation processor 14 ends the second program accumulation reservation processing without any further process.

As described above, according to this embodiment, it is possible to set a DL reservation of a delivery program in priority to the recording reservation, thus improving usability for a user intending to download the program from the beginning.

Fourth Embodiment

Next, a fourth embodiment of the present invention will be described.

Figure 14:
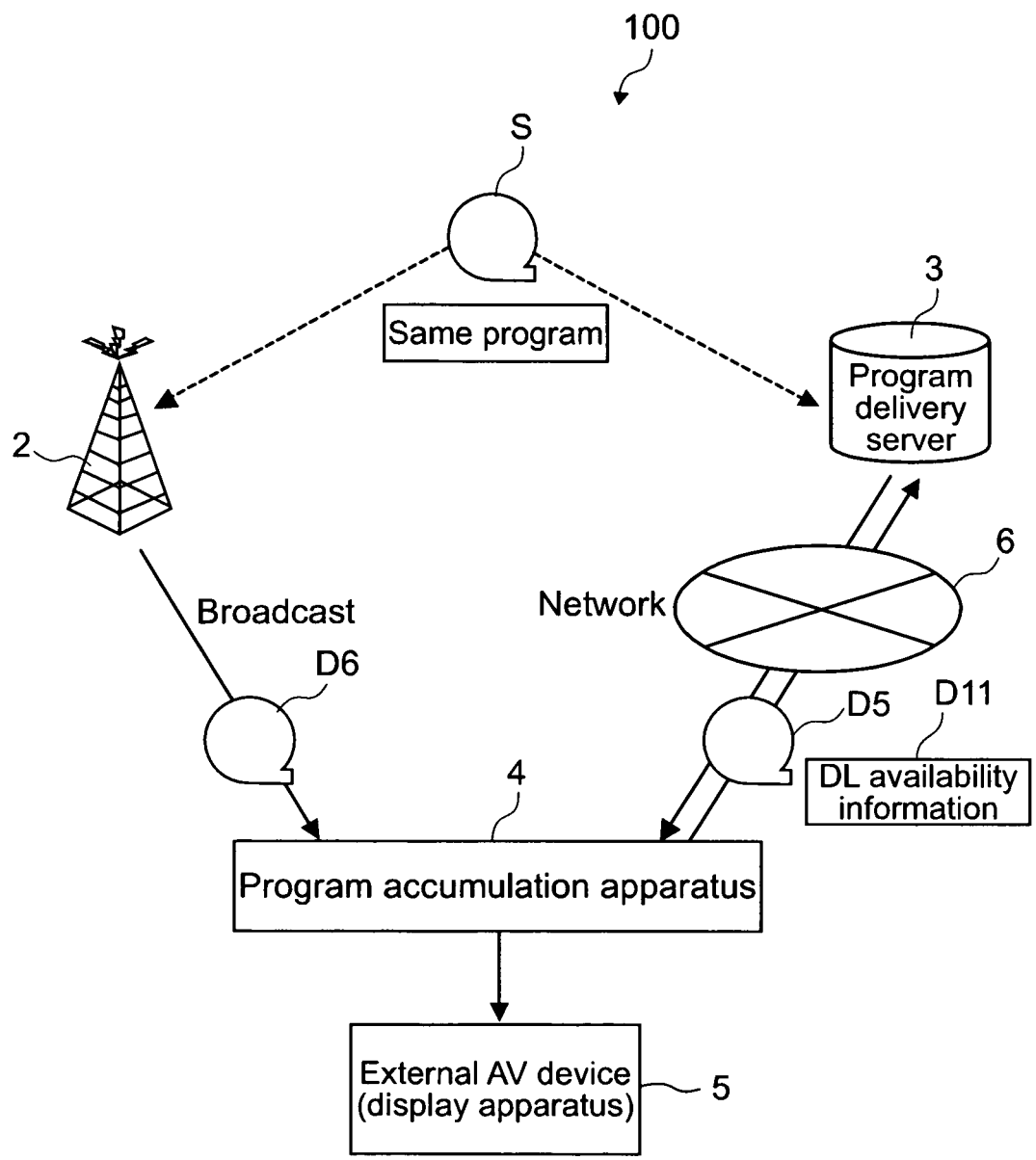
FIG. 14 is a diagram showing a structure of a program accumulation system according to a fourth embodiment of the present invention.

FIG. 14 is a diagram showing a structure of a program accumulation system according to the fourth embodiment.

As shown in the figure, a program accumulation system 100 of this embodiment is different from the program accumulation system 1 of the above embodiments in that the program delivery server 3 is capable of delivering, to the program accumulation apparatus 4, DL availability information D11 containing information on a program ID, a program name, a DL-available date/time, a DL source URL, and the like of programs that can be delivered therefrom by the DL method, and the broadcasting station 2 delivers EPG data D12 containing information on a program ID, a program name, a start date/time, an end date/time, a channel, and the like, to which the DL availability information is not appended.

The program accumulation apparatus 4 acquires the DL availability information D11 from the program delivery server 3 and the EPG data D12 from the broadcasting station 2 using the EPG data acquisition section 11, and stores the data in the EPG data storage section 12. The EPG display processor 13 merges the DL availability information D11 and the EPG data D12 from the EPG data storage section 12 to thus generate an EPG display screen, and outputs the EPG display screen to the external AV device 5 via the AV interface section 106. As a result, a DL-availability-information-attached EPG shown in FIG. 5 is displayed on the display screen of the external AV device 5. Other operations are the same as those of the first embodiment.

In the above embodiments, the cases where the present invention is applied to the system in which the program data and the EPG data are delivered from the broadcasting station using broadcast waves have been described. However, it is also possible to apply the present invention to a system in which the program data and the EPG data are delivered through broadcast waves from the program delivery server 3 or other program delivery servers via the network using an IP multicast system.

In addition, the functional structure implemented in the program accumulation apparatus 4 of this embodiment can be constituted as a program such as an application program for causing a computer to operate as those functions. By storing the program in a computer-readable storage medium, the program can be distributed.

It should be understood by those skilled in the art that various modifications, combinations, sub-combinations and alterations may occur depending on design requirements and other factors insofar as they are within the scope of the appended claims or the equivalents thereof.

What is claimed is:

1. A program accumulation apparatus, comprising:
one or more processors operable to:
acquire Electronic Program Guide (EPG) data of a broadcast program from a broadcasting station and data of a delivery program from a server, wherein the EPG data of the broadcast program is based on a preset recording reservation, and the data of the delivery program is based on a preset download reservation, wherein the broadcast program and the delivery program correspond to a predetermined source;
store recording reservation data of the broadcast program and download reservation data of the delivery program;
acquire download availability information that indicates whether the delivery program can be delivered by a downloading method, the download availability information of the delivery program being attached to the EPG data for each broadcast program; and
in response to a cancellation of the preset recording reservation or the preset download reservation, change the download reservation data associated with the preset download reservation to the recording reservation data associated with the preset recording reservation, wherein the preset recording reservation of the broadcast program was previously changed to the preset download reservation based on one or more factors.

2. The program accumulation apparatus according to claim 1, wherein the one or more processors are operable to acquire the download availability information containing information for specifying the delivery program of the same source as the broadcast program.

3. The program accumulation apparatus according to claim 1, wherein the one or more processors are operable to:
determine, when a content of a reservation data storage section is updated with respect to the download reservation data, whether the preset recording reservation of the broadcast program of the same source as the delivery program, that is a target for the download reservation, is possible, and changing, when determined that the preset recording reservation is possible, the download reservation data to the recording reservation data for the preset recording reservation of the broadcast program.

4. The program accumulation apparatus according to claim 1, wherein the one or more processors are operable to determine whether the preset recording reservation of a designated broadcast program is possible based on at least a presence/absence of an overlap between a recording date/time of a broadcast program already set to the preset recording reservation and a recording date/time of the designated broadcast program.

5. The program accumulation apparatus according to claim 1, wherein the one or more processors are operable to determine whether the preset recording reservation of a designated broadcast program is possible by comparing at least a free storage capacity of a storage section and a recording data size of the designated broadcast program.

6. The program accumulation apparatus according to claim 1, wherein the one or more processors are operable to determine whether the preset recording reservation of a designated broadcast program is possible based on at least a presence/absence of an overlap between a recording date/time of a broadcast program already set to the preset recording reservation and a recording date/time of the designated broadcast program.

7. The program accumulation apparatus according to claim 1, wherein the one or more processors are operable to determine whether the preset recording reservation of a designated broadcast program is possible by comparing at least a free storage capacity of a storage section and a recording data size of the designated broadcast program.

8. The program accumulation apparatus according to claim 1, wherein the one or more factors comprise: lack of availability of a tuner due to a temporal overlap with another recording reservation or an insufficient free storage capacity while storing the broadcast program or the delivery program.

9. The program accumulation apparatus according to claim 1, wherein the one or more processors operable to designate the broadcast program to be set to the preset recording reservation.

10. The program accumulation apparatus according to claim 1, wherein the one or more processors operable to designate the delivery program to be set to the preset recording reservation.

11. The program accumulation apparatus according to claim 1, wherein the EPG data comprises one or more of: a program identifier (ID), a program name, a start date/time, an end date/time, and/or a channel.

12. The program accumulation apparatus according to claim 1, wherein the one or more processors are operable to accumulate and reproduce the EPG data of the broadcast program and the data of the delivery program.

13. The program accumulation apparatus according to claim 1, wherein the download availability information comprises guide information of a plurality of programs.

14. The program accumulation apparatus according to claim 13, wherein the guide information of each of the plurality of programs comprises a program identifier (ID), a program name, a broadcast start date/time, a broadcast end date/time, a channel, a download available date/time, a bit rate, a download source uniform resource locator (URL), and thumbnail information.

15. The program accumulation apparatus according to claim 1, wherein the one or more processors are operable to delete one of: the recording reservation data and the download reservation data, based on the cancellation of the preset recording reservation or the preset download reservation to create free storage capacity.

16. A program accumulation reservation method, comprising:

in a program accumulation apparatus:
acquiring Electronic Program Guide (EPG) data of a broadcast program from a broadcasting station and data of a delivery program from a server, wherein the EPG data of the broadcast program is based on a preset recording reservation, and the data of the delivery program is based on a preset download reservation, wherein the broadcast program and the delivery program correspond to a predetermined source;
storing recording reservation data of the broadcast program and download reservation data of the delivery program;
acquiring download availability information that indicates whether the delivery program can be delivered by a downloading method, the download availability information of the delivery program being attached to the EPG data for each broadcast program; and
in response to a cancellation of the preset recording reservation or the preset download reservation, changing the download reservation data associated with the preset download reservation to the recording reservation data associated with the preset recording reservation, wherein the preset recording reservation of the broadcast program was previously changed to the preset download reservation based on one or more factors.

17. The method according to claim 16, wherein the one or more factors comprise: lack of availability of a tuner due to a temporal overlap with another recording reservation or an insufficient free storage capacity while storing the broadcast program or the delivery program.

18. The method according to claim 16, further comprising deleting one of: the recording reservation data and the download reservation data based on the cancellation of the preset recording reservation or the preset download reservation to create free storage capacity.

19. A non-transitory computer-readable storage medium having stored thereon, a computer program having at least one code section for program accumulation, the at least one code section being executable by a computer for causing the computer to perform steps comprising:

in a program accumulation apparatus:
acquire Electronic Program Guide (EPG) data of a broadcast program from a broadcasting station and data of a delivery program from a server, wherein the EPG data of the broadcast program is based on a preset recording reservation, and the data of the delivery program is based on a preset download reservation, wherein the broadcast program and the delivery program correspond to a predetermined source;
store recording reservation data of the broadcast program and download reservation data of the delivery program;
acquire download availability information that indicates whether the delivery program can be delivered by a downloading method, the download availability information of the delivery program being attached to the EPG data for each broadcast program;
in response to a cancellation of the preset recording reservation or the preset download reservation, change the download reservation data associated with the preset download reservation to the recording reservation data associated with the preset recording reservation, wherein the preset recording reservation of the broadcast program was previously changed to the preset download reservation based on one or more factors.

20. The non-transitory computer-readable storage medium according to claim 19, further comprising deleting one of: the recording reservation data and the download reservation data, based on the cancellation of the preset recording reservation or the preset download reservation to create free storage capacity.

* * * * *